United States Patent [19]
Nakamura et al.

[11] Patent Number: 4,712,970
[45] Date of Patent: Dec. 15, 1987

[54] METHOD FOR HANDLING A WORK IN A ROBOT SYSTEM

[75] Inventors: Hirō Nakamura; Shūji Ohkawa; Yasuo Ohtsuka; Hajime Tachikawa; Toshiya Shinozaki, all of Yokohama, Japan

[73] Assignee: Hitachi, Ltd., Tokyo, Japan

[21] Appl. No.: 741,949

[22] Filed: Jun. 6, 1985

[30] Foreign Application Priority Data

Jun. 8, 1984 [JP] Japan .................................. 59-116392

[51] Int. Cl.$^4$ ............................ B25J 9/16; B25J 19/04
[52] U.S. Cl. ........................................ 414/730; 901/3; 901/47
[58] Field of Search ........................................ 901/3–5, 901/47; 414/786, 730; 318/568; 364/513, 559

[56] References Cited

U.S. PATENT DOCUMENTS

| | | | |
|---|---|---|---|
| 3,503,527 | 3/1970 | Devol | 901/47 X |
| 3,804,270 | 4/1974 | Michaud et al. | 901/47 X |
| 3,986,007 | 10/1976 | Ruoff, Jr. | 364/513 |
| 4,017,721 | 4/1977 | Michaud | 901/47 X |
| 4,187,051 | 2/1980 | Kirsch et al. | 901/47 X |
| 4,456,961 | 6/1984 | Price et al. | 318/568 E |

OTHER PUBLICATIONS

Computer Vision Systems for Industrial Inspection and Assembly, Gerald J. Agin; Carnegie-Mellon University (May 1980), IEEE, Computer.

Primary Examiner—Joseph J. Rolla
Assistant Examiner—Nils Pedersen
Attorney, Agent, or Firm—Fay, Sharpe, Beall, Fagan, Minnich & McKee

[57] ABSTRACT

A method for teaching a holding position and a holding angle of a work by a hand of a robot to the robot in a robot system having a visual sensor attached to a movable arm of the robot. First, the work is held by the hand which is in a prescribed reference angle state and put down on a working table with keeping the holding state. Next, the centroid position and the angle of the principal axis of the work are recognized by the visual sensor. Finally, the holding position and the holding angle are acquired by using the centroid position and the angle of the principal axis, a posture data of the robot and the hand, and a mutual relation data of a robot coordinate, a visual coordinate and a hand coordinate of the robot system.

18 Claims, 8 Drawing Figures

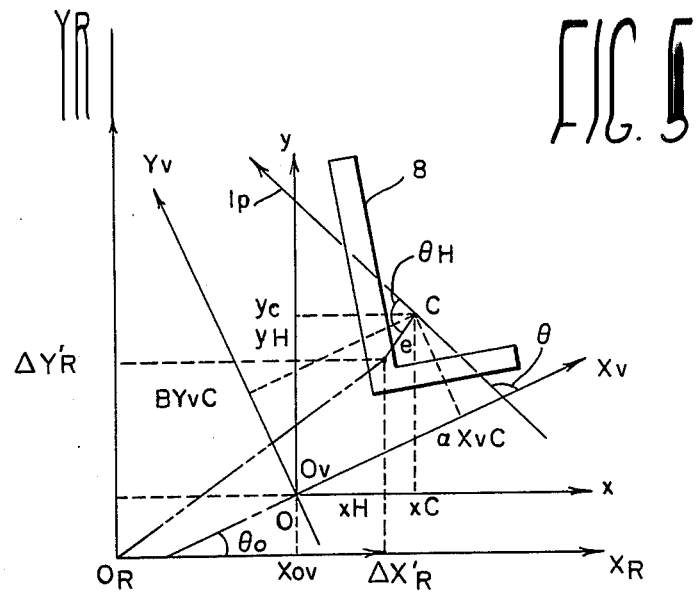
FIG. 5
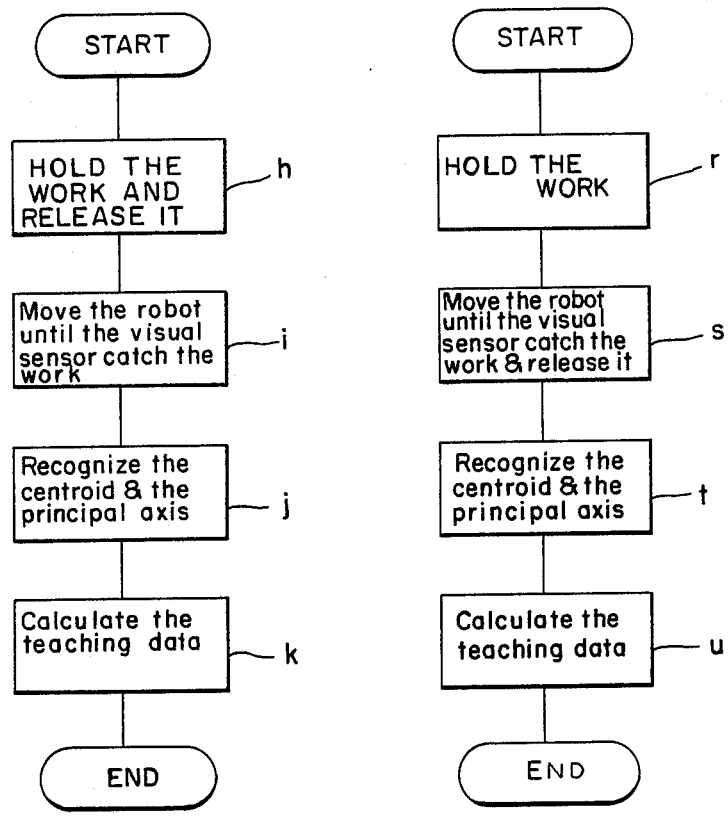
FIG. 6
FIG. 7

METHOD FOR HANDLING A WORK IN A ROBOT SYSTEM

BACKGROUND OF THE INVENTION

This invention relates to a method for handling a work in a robot system, especially a method for teaching a holding position of the work and a holding angle of a hand holding the work at the holding position in the robot system having a visual sensor.

In a robot system like an industrial robot, first, a man directly or indirectly teaches operations to the robot in a teaching mode or a training mode, so that the operations are entered into the memory of the robot system. Then, the robot reproduces the memorized operations for actual processing. Accordingly, for example, in the case of handling works, parts, or objects, the work to be handled has to be exactly positioned at the place determined in the teaching mode. Usually, however, it is very difficult to do so.

In order to resolve such a problem, conventional methods attach a visual sensor to the robot so as to recognize the position, the direction or the orientation and the shape of the work and handle it by using these data. It is comparatively easy to handle the work, if it lies within the visual field of the visual sensor.

Such a robot system is disclosed in some technical papers, for example, Gerald J. Agin: "Computer Vision Systems for Industrial Inspection and Assembly", COMPUTER, May, 1980, pp. 11 to 20.

Generally, in the robot system having the visual sensor, there are a visual coordinate, a robot coordinate and a hand coordinate, which are usually different from each other. Further, the holding position of the work and the holding angle of the hand holding the work, which is initially held by the hand of the robot, inherently depend on each work. Therefore, in the case of moving the robot by using measured data of the visual sensor, it is necessary to acquire in advance the mutual relations between all of the coordinates, the holding position of the work and the holding angle of the hand holding the work.

There are some methods for obtaining the mutual relations between all of the coordinates in the prior art. For example, the Japanese Laid Open Patent Application No. 58-114887, laid open on July 8, 1983, discloses a method using two marks attached to the work. Namely, the positions of the marks within the visual field are input by the visual sensor, and the mutual relations are determined by using the position data of the two marks and the posture data of the robot. In this method, however, it is necessary to know the exact positions of two marks on the work in advance. Further, this prior art does not disclose how to acquire the holding position and the holding angle of the work, because, this prior art is made on the assumption that the shape of the work is a square.

SUMMARY OF THE INVENTION

It is an object to provide a method for handling a work in a robot system having a visual sensor.

It is another object to get a holding position of the work and a holding angle of a hand holding the work at the holding position in a simple manner.

In order to achieve the above objects, in the present invention, a work is held in a prescribed work state defined by a holding position of the work and a holding angle of the hand holding the work at the holding position by a hand which is in a known hand state, the centroid and the principal axis of the work are recognized by a visual sensor of the robot system, and the holding position of the work and the holding angle of the hand holding the work at the holding position are obtained by using the centroid coordinate values, the angle of the principal axis, the data of the hand state, and a mutual relation of a robot coordinate, a visual coordinate and a hand coordinate.

According to the present invention, in the robot system in which the visual sensor is attached to a movable arm of the robot, first, the work is held in the prescribed work state by the hand which is in the hand state and put on a working table while keeping the prescribed work state, next, the visual sensor is moved by moving the movable arm so that the work comes into the visual field of the visual sensor, and the centroid coordinate values and the angle of the principal axis in the visual coordinate are recognized by the visual sensor.

In contrast, in the robot system in which the visual sensor is not attached to the movable arm of the robot, first, the work is held in the prescribed work state by the hand which is in a known reference hand state, the hand is moved by moving the movable arm so that the work comes into the visual field of the visual sensor, the work is put on the working table while keeping the prescribed work state, and the centroid coordinate values and the angle of the principal axis of the work are recognized by the visual sensor.

Further, the present invention provides a robot system comprising a robot, a visual sensor which comprises a picture input apparatus and a picture processing unit connected to an output terminal of the picture input apparatus for acquiring centroid coordinate values and an angle of the principal axis of a work in a visual coordinate, and a computing machine connected to an output of the picture processing unit and the robot for calculating teaching data.

BRIEF DESCRIPTION OF THE DRAWINGS

FIG. 5 illustrates a schematic diagram of the mutual relation between a robot coordinate and a visual coordinate used in the robot system shown in FIG. 4, FIGS. 6 and 7 show flowcharts for explaining operations of the first and second embodiments of the present invention, respectively.

DETAILED DESCRIPTION OF THE PREFERRED EMBODIMENT

Figure 1:
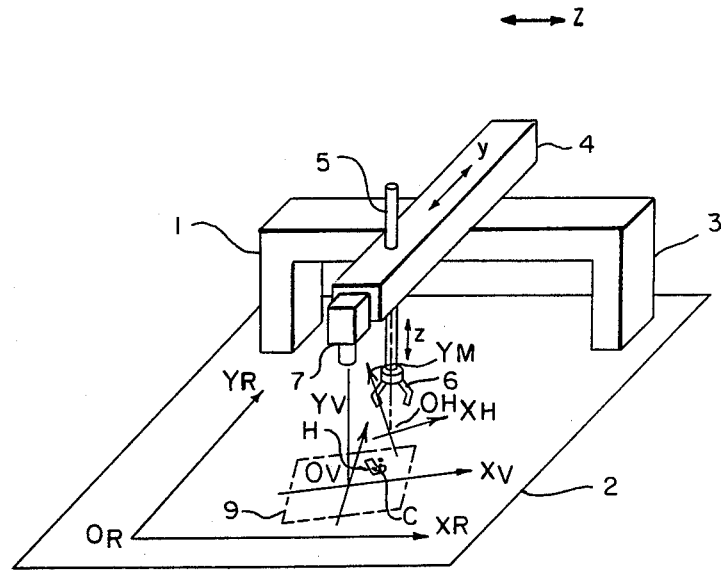
FIG. 1 shows a schematic diagram of a robot system using a Cartesian coordinate robot for explaining the first embodiment of this invention.

FIG. 1 shows an example of a Cartesian coordinate robot which can move in x, y and z directions. In FIG. 1, the numerals 2 and 3 denote a working table and a fixed arm of the robot, respectively.

The numeral 4 designates a horizontally movable arm which can move in the x and y directions on the fixed arm 3. The numeral 5 denotes a vertically movable arm which is able to move in the z direction.

The numerals 6 and 7 designate a hand attached to the vertically movable arm 5 and a visual sensor using a video camera attached to an end of the horizontally movable arm 4, respectively. The numerals 8 and 9 denote a work to be handled by the hand 6 and a visual field of the visual sensor 7, respectively. Further, $(X_R\text{-}O_R\text{-}Y_R)$, $(X_V\text{-}O_V\text{-}Y_V)$ and $(X_H\text{-}O_H\text{-}Y_H)$ indicate a robot coordinate, a visual coordinate and a hand coordinate, respectively. The movements to the x, y directions are parallel to axes of the robot coordinate $(X_R\text{-}O_R\text{-}Y_R)$. Points H and C denote a reference point for handling the work 8 and a centroid of the work 8, respectively.

The operations of the robot 1 and the visual sensor 7 in this configuration will be explained according to the flowchart shown in FIG. 6.

STEP 1

The work 8 is held by the hand 6 at a prescribed holding position of the work and a prescribed holding angle of the hand holding the work at the prescribed holding position. The hand 6 is in a known reference hand state. The work 8 is put down softly on the working table 2 while keeping the prescribed work state FIG. 6-h). As a result, a reference point of the hand 6, that is, the origin point $O_H$ of the hand coordinate, is set to coincide with the reference point H of the work 8.

STEP 2

By moving the horizontally movable arm 4, the visual sensor 7 is moved $\Delta X_R$, $\Delta Y_R$ in the robot coordinate, so that the work 8 comes within the visual field 9 of the visual sensor 7 (FIG. 6-i).

STEP 3

By using the visual sensor 7, the coordinate values $(X_{vc}, Y_{vc})$ of the centroid C of the work 8 and the angle $\theta$ of the principal axis of the work 8 in the visual coordinate are recognized (FIG. 6-j). A method for recognizing the coordinate values of the centroid and the angle of the principal axis by using the visual sensor is well known in the prior art, for example, the above mentioned article by G. J. Agin.

STEP 4

After the above steps, teaching data, that is, the holding position and the holding angle, are calculated by using the moving amount $(\Delta X_R, \Delta Y_R)$, the centroid coordinate values $(X_{vc}, Y_{vc})$ and the angle $\theta$ of the principal axis $1p$.

Figure 2:
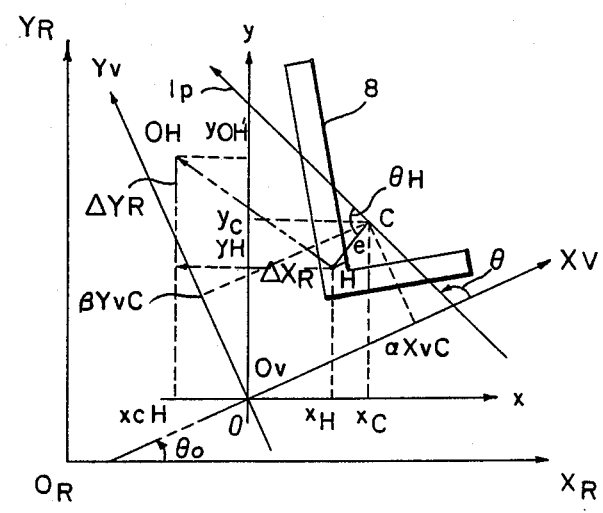
FIG. 2 illustrates a schematic diagram of the mutual relation between a robot coordinate and a visual coordinate used in the robot system shown in FIG. 1.

In relation to the 4th step, a method for calculating the teaching data will be explained hereinafter. FIG. 2 shows the mutual relations between coordinate values of all of the coordinates in response to the motions of the 2nd and 3rd steps. The origin point $O_H$ of the hand coordinate is $\Delta X_R$, $\Delta Y_R$ apart from the handling reference point H. Coordinate (x-O-y) is a provisional one, which has an original point Ov, that is the original point of the visual coordinate, and is parallel to the robot coordinate $(X_R\text{-}O_R\text{-}Y_R)$. Then, the following formulas are found in relation to the coordinate values shown in FIG. 2.

$$x_c = \alpha X_{vc} \cos\theta_o - \beta Y_{vc} \sin\theta_o \tag{1}$$

$$y_c = \alpha X_{vc} \sin\theta_o + \beta Y_{vc} \cos\theta_o \tag{2}$$

$$x_H = x_{OH} - \Delta X_R \tag{3}$$

$$y_H = y_{OH} - \Delta Y_R \tag{4}$$

$$e = \sqrt{(x_H - x_C)^2 + (y_H - y_C)^2} \tag{5}$$

$$\theta_H = \tan(y_H\text{-}y_C)/(x_H\text{-}x_C)\text{-}\theta_o\text{-}\theta \tag{6}$$

Here, $\alpha$ and $\beta$ denote magnifications of the robot coordinate to the visual coordinate in the x, y directions, respectively, $\theta o$ designates an angle of the visual coordinate to the robot coordinate, and $x_{OH}$, $y_{OH}$ indicate x, y coordinates of the original point $O_H$ of the hand coordinate to the origin point Ov.

As apparent from FIG. 2, e indicates a distance between the handling reference point H and the centroid C, and $\theta_H$ designates an angle of a straight line CH against the principal axis $1p$.

Figure 3:
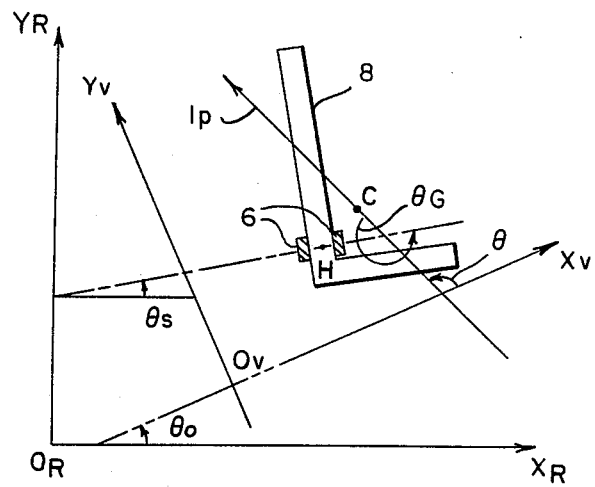
FIG. 3 illustrates a schematic diagram of an angle relation of the robot coordinate and a work in the robot system shown in FIG. 1.

Further, FIG. 3 shows the angle relation between the robot and visual coordinates in case of holding the work 8 by the hand 6. The position of the hand 6 shown in FIG. 3 shows the condition of the 1st step. The angle relation is described as the following formula.

$$\theta_G = 2\pi + \theta_s - \theta_o - \theta \tag{7}$$

Here, $\theta_s$ indicates the known reference angle of the hand 6 in the reference hand state, that is, an angle of a reference line of the hand 6 in the robot coordinate.

Under the formulas (1) to (7), as mentioned before, the mutual relations between all of the coordinates, for example, $\alpha$, $\beta$, $\theta o$, $x_{OH}$, $y_{OH}$, $\theta s$, etc., have been already acquired by another method and stored in the robot system.

Therefore, it is possible to calculate a relationship between the holding position and the centroid and a relationship between the holding angle and the principal axis $1p$ of the work, by using the moving amounts $\Delta X_R$ and $\Delta Y_R$; that is, the posture data of the hand and the robot in the robot coordinate, the centroid coordinate values (Xvc, Yvc) and the angle $\theta$ of the principal axis $1p$.

Namely, the holding position is indicated by the distance e from the centroid C and the angle $\theta_H$ of the straight line CH, and the holding angle of the hand is indicated by the angle $\theta_G$ to the principal axis $1p$.

Next, another embodiment of this invention will be explained by using FIG. 4. In this embodiment, another robot system, in which the visual sensor is fixed apart from the Cartesian coordinates robot, especially the movable arms thereof, is used.

Figure 4:
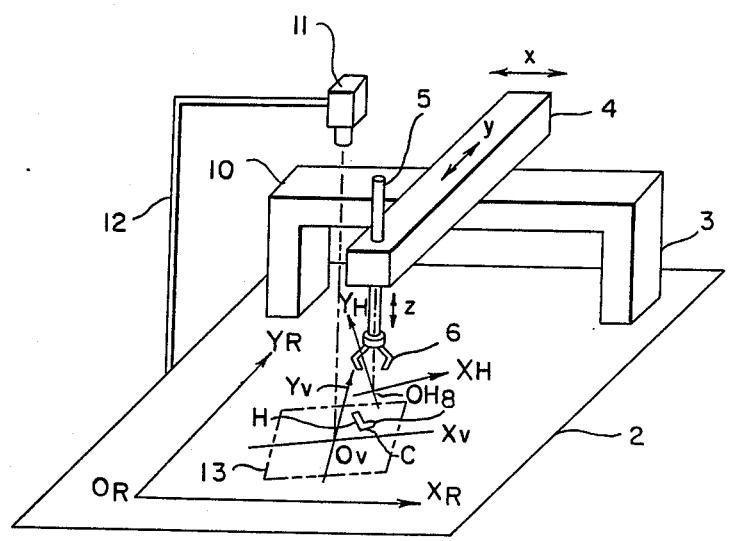
FIG. 4 shows a schematic diagram of another robot system using a Cartesian coordinate robot for explaining the second embodiment of this invention.

In FIG. 4, the numerals which are the same as in FIG. 1 denote the same objects as shown in FIG. 1, respectively.

Referring to FIG. 4, the numeral 12 designates a fixing means which fixes the visual sensor 11 at a constant position. That is, the visual coordinate (Xv-Ov-Yv) is fixed to a predetermined mutual relation to the robot coordinate $(X_R\text{-}O_R\text{-}Y_R)$. The numeral 13 denotes a visual field of the visual sensor in this case.

With reference to this configuaration, operations of the robot 10 and the visual sensor 11 are explained by using the flowchart shown in FIG. 7.

STEP 1

The robot 10 holds the work 8 at a prescribed holding position and a prescribed holding angle by the hand 6, which is in a known reference hand state in the robot coordinate (FIG. 7-r).

STEP 2

After moving the work 8 $\Delta X_R'$, $\Delta Y_R'$ by the horizontally movable arm 4, it is brought within the visual field 13 of the visual sensor 7, and put down softly at a known hand state on the working table 2 while keeping the previous prescribed work state (FIG. 7-s).

STEP 3

By using the visual sensor 7, the centroid coordinate values (Xvc, Yvc) and the angle of the principal axis 1p in the visual coordinates are recognized.

STEP 4

After the above steps, the teaching data, that is, the holding position and the holding angle are calculated by using the moving amount ($\Delta X_R'$, $\Delta Y_R'$), the centroid coordinate values (Xvc, Yvc) and the angle $\theta$ of the principal axis 1p.

Next, a method to obtain the teaching data in the 4th step is explained. FIG. 5 shows the mutual relations between coordinate values of the coordinates concerning the motions of the 1st, 2nd, and 3rd steps. In FIG. 5 the original point OH of the hand coordinate is set to coincide with the handling reference point H of the work. Coordinate (x-o-y) is a provisional one as explained in the first embodiment. Accordingly, the following formulas are found in relation to the coordinate values shown in FIG. 5

$$x_c = \alpha X_{vc} \cos\theta_o - \beta Y_{vc} \sin\theta_o \tag{8}$$

$$y_c = \alpha X_{vc} \sin\theta_o + \beta Y_{vc} \cos\theta_o \tag{9}$$

$$x_H = -X_{ov} + \Delta X_R' \tag{10}$$

$$y_H = -Y_{ov} + \Delta Y_R' \tag{11}$$

$$e = \sqrt{(x_H - x_C)^2 + (y_H - y_C)^2} \tag{12}$$

$$\theta_H = \tan^{-1}(y_H - y_c)/(x_H - x_c) - \theta_o - \theta \tag{13}$$

Here, Xov and Yov indicate coordinate values of the original point Ov of the visual coordinate against to the robot coordinate, respectively. Further, this embodiment has the same angle relation as explained in the first embodiment, so that the following formula is found, too.

$$\theta_G = 2\pi + \theta_s - \theta_o - \theta \tag{14}$$

Accordingly, it is possible to calculate a relationship between the holding position and the centroid C and a relationship between the holding angle and the principal axis 1p of the work, by using the obtained data, that is, the moving amounts of the robot $\Delta X_R'$ and $\Delta Y_R'$, the centroid coordinate values (Xvc, Yvc) and the angle $\theta$ of the principal axis 1p, like the following:

The Holding Position: In FIG. 5, the holding position of the work is indicated by the distance e from the centroid C and the angle $\theta_H$ of the straight line CH.

The Holding Angle: The holding angle of the hand is indicated by the angle $\theta_G$ to the principal axis 1p.

As a result of the above description, in both the robot systems shown in FIGS. 1 and 4, concerning the actual processing, that is, in an actual handling mode, the work is moved into the visual field of the visual sensor, the centroid coordinate values and the angle of the principal axis of the work are recognized. Next, by using the parameters e, $\theta_H$ and $\theta_G$, the holding point of the work and the holding angle of the hand are obtained from the centroid coordinate values and the angle of the principal axis, and input to a computing machine of the robot system, so that it is possible to hold the work by the hand at the constant position and the constant angle.

Figure 8:
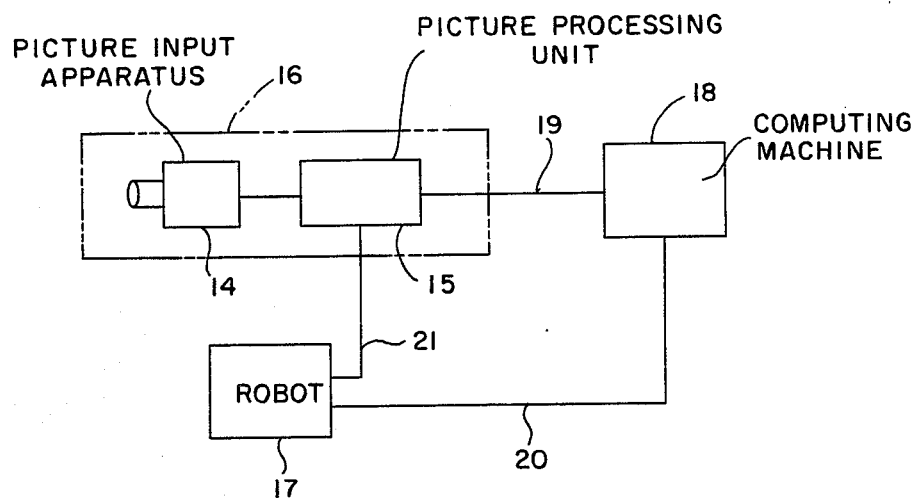
FIG. 8 shows a block diagram of an embodiment of a robot system of the present invention.

By the way, in the actual processing, the teaching data is acquired in advance, and by using the teaching data and the recognition data of the visual sensor, the data of the moving amounts of the robot, that is, the moving amounts in the $X_R$, $X_R$ direction, and the rotation angle of the hand, are acquired, so that the robot will be moved. FIG. 8 shows an embodiment of the total robot system in this case. Referring to FIG. 8, the numeral 16 indicates a visual sensor which comprises a picture input apparatus 14, for example, a video camera, and a picture processing unit 15 for processing the input picture. The numerals 17 and 18 denote a robot and a computing machine, for example, a microcomputer which is used for teaching, respectively.

In this configuration, in the teaching mode, communication lines 19 and 20 are used for controlling the robot 18 in response to instructions from the computing machine 18 and delivering the recognition data of the visual sensor 16, that is, the centroid coordinate values and the angle of the principal axis, to the computing machine 18, and further the computing machine 18 calculates the teaching data and transfers the teaching data to the picuture processing unit 15 for memorizing them in the picture processing unit 15.

Next, in the actual handling mode, by using one other communication line 21, the input picture is provided to the picture processing unit 15 from the picture input apparatus 14, the centroid coordinate values and the angle of the principal axis are recognized and the moving amounts of the robot 17 are calculated, and the data of the moving amounts are supplied to the robot 17, so that the robot can handle the work. As a result, it is possible to reduce the amount for processing in the visual sensor 16, to make the computing machine 17 unnecessary in the actual handling mode, and to reduce the total cost of the robot system.

Now, in the above-mentioned embodiments, the robot system using the Cartesian coordinate robot is explained. However, even if the robot system uses a cylindrical coordinate robot, a polar coordinate robot or an articulated robot, it is possible to directly apply the present invention in the case that the moving amounts can be indicated in the x, y directions of the Cartesian coordinate.

As mentioned above, the present invention can provide the robot system that exactly determines the holding position and the holding angle, only by holding the work by the hand and after that, recognizing the centroid and the principal axis of the work.

We claim:

1. A method for handling a work in a robot system employing a visual sensor capable of recognizing a centroid position of the work and an angle between a principal axis of the work and one coordinate axis of a visual field of the visual sensor in at least one plane, a robot having a hand for holding the work and a movable arm for moving the hand, comprising the teaching steps of:
- holding the work with the hand of the robot in a prescribed work state defined by a holding position of the work and a holding angle of the hand holding the work relative to said plane at said holding position in the visual field of the visual sensor, with the hand being in a hand state and data representative of said hand state in at least said plane being temporarily stored in the robot system;
- supporting the work independently of the hand and releasing the hand from the work in the plane while keeping the work in the same prescribed work state as during said step of holding;
- recognizing with the visual sensor the centroid position of the work and the angle of the principal axis of the work in the plane while keeping the work in the same prescribed work state as during said step of holding; and
- storing at least temporarily data representative of the centroid position and the angle of the principal axis in the robot system.

2. A method for handling a work according to claim 1, further comprising the steps of:
- calculating a relationship between said holding position and the centroid position and a relationship between said holding angle and the angle of the principal axis in the plane by using at least said data representative of said hand state, said data representative of the centroid position and the angle of the principal axis; and
- storing said relationships as teaching data in the robot system.

3. A method for handling a work according to claim 2, further comprising the step of:
- storing mutual relation data between a robot coordinate of the robot and a visual coordinate of the visual sensor, and using said mutual relation data in said step of calculating.

4. A method for handling a work according to claim 3, further comprising the steps of:
- carrying the visual sensor on the movable arm; and
- moving the movable arm in order to carry the visual sensor so that the work comes into the visual field of the visual sensor, prior to said step of holding.

5. A method for handling a work according to claim 3, further comprising the steps of:
- moving the movable arm in order to carry the work so that the work comes into the visual field of the visual sensor prior to said step of holding.

6. A method for handling a work according to claim 5, further comprising the steps of:
- holding the work by the hand, with the hand being in a reference hand state prior to said step of moving, in said step of holding, said data representative of said hand state comprises data representative of said reference hand state and a moving amount of the hand in said step of moving.

7. A method for handling a work according to claim 1, wherein
- said step of holding includes the step of putting down the work on a working table in a direction perpendicular to the plane.

8. A method for handling a work according to claim 1, further comprising the step of:
- moving the hand out of the visual field before said step of recognizing.

9. A method for handling a work according to claim 2, further comprising the actual processing steps of:
- recognizing with the visual sensor a centroid position of an other work and an angle of a principal axis of said other work in the visual field;
- calculating a holding position of said other work and a holding angle of the hand holding said other work at said holding position of said other work in the plane by using said centroid position of said other work, said angle of the principal axis of said other work and said teaching data; and
- holding said other work at said holding position of said other work and said holding angle of the hand holding said other work at said holding position of said other work.

10. A method for handling a work according to claim 9, wherein
- said step of positioning includes the step of moving the movable arm in order to carry the visual sensor so that said other work comes into the visual field of the visual sensor.

11. A method for handling a work in a robot system having a visual sensor capable of recognizing a centroid position of the work in a visual coordinate of the visual sensor, in which a robot has a hand for holding the work and a movable arm for moving the hand, comprising the teaching steps of:
- storing mutual relation data between a robot coordinate of the robot, the visual coordinate and a hand coordinate of the hand in the robot system;
- holding a teaching work with the hand of the robot in a prescribed work state defined by a holding position of said teaching work and a holding angle of the hand holding said teaching work relative to a plane including said visual coordinate at said holding position in a visual field of the visual sensor, with the hand being in a hand state, data representative of said hand state in at least said robot coordinate being temporarily stored in the robot system;
- supporting said teaching work independently of the hand and releasing the hand from said teaching work while keeping said teaching work in said prescribed work state;
- recognizing with the visual sensor a centroid position of said teaching work and an angle between a principal axis of said teaching work and one coordinate axis of a visual field of the visual sensor while keeping said teaching work in said prescribed work state; and
- storing at least temporarily data representative of said centroid position and said angle of the principal axis of said teaching work in the robot system.

12. A method for handling a work according to claim 11, further comprising the teaching steps of:
- calculating a relationship between said holding position of said teaching work and said centroid position of said teaching work and a relationship between said holding angle of the hand holding said teaching work at said holding position and said angle of the principal axis of said teaching work by using said mutual relation data, said data representative of said hand state and said data representative of said centroid position and said angle of the principal axis of said teaching work; and storing said relationships as teaching data in the robot system.

13. A method for handling a work according to claim 12, further comprising the teaching steps of:
carrying the visual sensor on the movable arm; and
moving the movable arm in order to carry the visual sensor so that said teaching work comes into the visual field of the visual sensor, prior to said step of holding.

14. A method for handling a work according to claim 12, further comprising the teaching steps of:
moving the movable arm in order to carry said teaching work so that said teaching work comes into the visual field of the visual sensor, prior to said step of holding.

15. A method for handling a work according to claim 14, further comprising the teaching steps of:
holding said teaching work by the hand, with the hand being in a reference hand state prior to said step of moving, and in said step of holding, said data representative of said hand state comprises data representative of said reference hand state and a moving amount of the hand in said step of moving.

16. A method for handling a work according to claim 12, further comprising the actual processing steps of:
positioning the work in the visual field;
recognizing with the visual sensor the centroid position of the work and the angle of the principal axis of the work in said visual coordinate;
calculating a holding position of the work and a holding angle of the hand holding the work at said holding position of the work by using the centroid position of the work, the angle of the principal axis of the work and said teaching data; and
holding the work at said holding position of the work and said holding angle of the hand.

17. A method for handling a work according to claim 16, wherein
said step of positioning includes the step of moving the movable arm in order to carry the visual sensor so that the work comes into the visual field of the visual sensor.

18. A method for handling a work in a robot system having a visual sensor capable of recognizing a centroid position of the work and an angle between a principal axis of the work and one coordinate axis of a visual field of the visual sensor, in which a robot has a hand for holidng the work and a movable arm for moving the hand, comprising the steps of:
positioning the work in the visual field of the visual sensor;
recognizing the centroid position of the work and the angle of the principal axis of the work in the visual field;
storing temporarily data representative of the centroid position of the work and the angle of the principal axis of the work in the robot system;
calculating a relation between a holding position and the centroid position of the work and a relation between a holding angle of the hand holding the work and the principal axis of the work, relative to a plane including said one coordinate axis at said holding position by using said data representative of the centroid position of the work and the angle of the principal axis of the work and other data stored in the robot system; and
holding the work at said holding position and said holding angle.

* * * * *